United States Patent
Rhodes et al.

(10) Patent No.: US 9,751,147 B2
(45) Date of Patent: Sep. 5, 2017

(54) FIXTURE FOR HIGH TEMPERATURE JOINING

(71) Applicant: Rolls-Royce Corporation, Indianapolis, IN (US)

(72) Inventors: Jeffrey F. Rhodes, Zionsville, IN (US); Christopher Owen Nash, Indianapolis, IN (US); Rusty M. Garner, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 14/727,593

(22) Filed: Jun. 1, 2015

(65) Prior Publication Data

US 2015/0343547 A1 Dec. 3, 2015

Related U.S. Application Data

(60) Provisional application No. 62/006,763, filed on Jun. 2, 2014.

(51) Int. Cl.
*B23K 37/00* (2006.01)
*B23K 37/04* (2006.01)
(Continued)

(52) U.S. Cl.
CPC ............ *B23K 3/087* (2013.01); *B23K 1/0018* (2013.01); *B23K 20/002* (2013.01);
(Continued)

(58) Field of Classification Search
CPC .. B23K 37/0443; B23K 20/02; B23K 20/023; B23K 37/0435
(Continued)

(56) References Cited

U.S. PATENT DOCUMENTS 1,799,019 A 3/1931 Mischler
4,058,880 A 11/1977 Hughey
(Continued)

FOREIGN PATENT DOCUMENTS

DE 10026829 A1 12/2001
GB 2458738 A 10/2009
(Continued)

OTHER PUBLICATIONS

Broker's, Inc (http://www.bokers.com/userfiles/file/2014-Washer-Catalog-Standard-web.pdf, Mar. 24, 2014 (from wayback machine).*

(Continued)

*Primary Examiner* — Erin Saad
(74) *Attorney, Agent, or Firm* — Shumaker & Sieffert, P.A.

(57) ABSTRACT

A fixture may include a plurality of alloy pressure pads shaped to contact a component to be brazed or diffusion bonded, a plurality of springs, and at least one alloy support. In some examples, each spring of the plurality of springs is shaped to have a substantially constant stress throughout the spring. The plurality of springs may be between and contacting the at least one alloy support and the plurality of alloy pressure pads to exert spring forces on the plurality of alloy pressure pads. In some examples, the plurality of springs include a plurality of silicon nitride springs.

18 Claims, 5 Drawing Sheets

(51) Int. Cl.

| | | |
|---|---|---|
| *B23K 3/08* | (2006.01) | |
| *B23K 20/00* | (2006.01) | |
| *B23K 20/02* | (2006.01) | |
| *B23K 1/00* | (2006.01) | |
| *B23K 20/16* | (2006.01) | |
| *B23K 20/233* | (2006.01) | |
| *B23K 20/26* | (2006.01) | |
| *B23K 101/00* | (2006.01) | |

(52) U.S. Cl.
 CPC ............ *B23K 20/023* (2013.01); *B23K 20/16* (2013.01); *B23K 20/233* (2013.01); *B23K 20/26* (2013.01); *B23K 37/0426* (2013.01); *B23K 37/0443* (2013.01); *B23K 2201/001* (2013.01)

(58) Field of Classification Search
 USPC ........................................ 228/212, 193, 44.3
 See application file for complete search history.

(56) References Cited

U.S. PATENT DOCUMENTS

| | | | |
|---|---|---|---|
| 4,089,456 A | 5/1978 | Toppen et al. | |
| 4,220,276 A | 9/1980 | Weisert et al. | |
| 4,750,946 A | 6/1988 | Jahnke et al. | |
| 5,020,716 A | 6/1991 | Miller et al. | |
| 5,083,371 A | 1/1992 | Leibfried et al. | |
| 5,181,647 A | 1/1993 | Runyan | |
| 5,316,202 A | 5/1994 | Murray et al. | |
| 6,003,754 A | 12/1999 | Rhodes | |
| 6,003,756 A | 12/1999 | Rhodes | |
| 6,006,780 A | 12/1999 | Tseng et al. | |
| 7,118,021 B2 | 10/2006 | Swartzbeck et al. | |
| 7,640,661 B2 | 1/2010 | Despreaux et al. | |
| 8,256,661 B2 | 9/2012 | Vandyke et al. | |
| 2012/0091186 A1 | 4/2012 | Akiyama et al. | |
| 2012/0111928 A1* | 5/2012 | Park .................... B23K 1/0018 228/245 |

FOREIGN PATENT DOCUMENTS

| | | | |
|---|---|---|---|
| JP | 55030319 A | * | 3/1980 |
| JP | 11197827 | | 7/1999 |

OTHER PUBLICATIONS

JP25-40775 computer english translation.*
Canadian Office Action from counterpart Canadian Application No. 2,893,299, dated Jun. 6, 2016, 4 pp.
Extended European Search report from counterpart European Application No. 15170060.6 Jul. 5, 2016, 7 pp.
Response to Search Opinion dated Jul. 5, 2016, from counterpart European Application No. 15170060.6, filed Jan. 13, 2017, 8 pp.
Notice of Allowance from counterpart Canadian Application No. 2,893,299, dated Apr. 13, 2017, 1 pg.

* cited by examiner

FIXTURE FOR HIGH TEMPERATURE JOINING

This application claims the benefit of U.S. Provisional Patent Application No. 62/006,763, filed Jun. 2, 2014, and titled, "FIXTURE FOR HIGH TEMPERATURE JOINING," the entire content of which is incorporated herein by reference.

TECHNICAL FIELD

The disclosure relates to fixtures for high temperature brazing or diffusion bonding techniques.

BACKGROUND

In high temperature brazing, two components may be joined by applying pressure between the two components and heating the components slightly above the melting point of a filler metal, followed by cooling to join the components. Because one or both of the components is above its standard working temperature, and thus may be deformable, the pressure between the two components must be controlled so as to not overly deform the components.

SUMMARY

In general, the disclosure describes a fixture for brazing or diffusion bonding multiple parts of a component together and techniques for using the fixture. In some examples, the fixture may include springs, superalloy pressure pads, and alloy supports. The springs may be designed and manufactured such that the spring possesses constant stress throughout the spring, which may provide high strain for a given load. In brazing, as the fixture and the multiple parts of the component are heated to the brazing temperature, the filler metal melts, and the strain in the springs releases and presses the parts of the component together. In diffusion bonding, the springs may be used to press the parts of the component together while heating the component.

In some examples, the fixture may include a plurality of springs, and at least one of the spring stiffness, pre-load, or load vectors may be simultaneously solved to achieve force and moment equilibrium about the parts to be brazed or diffusion bonded. This may reduce or substantially eliminate the need for residual loads to be reacted through the outer alloy supports to the parts to be brazed or diffusion bonded. Additionally or alternatively, this may reduce or substantially eliminate distortion of the component during the brazing or diffusion bonding technique, improve tooling life, or both.

In some examples, the disclosure describes a fixture comprising a plurality of alloy pressure pads shaped to contact a component to be brazed or diffusion bonded; a plurality of springs, wherein each spring of the plurality of springs is shaped to have a substantially constant stress throughout the spring; and at least one alloy support, wherein the plurality of springs are between and contacting the at least one alloy support and the plurality of alloy pressure pads to exert spring forces on the plurality of alloy pressure pads.

In some examples, the disclosure describes a method comprising assembling a component in a fixture, wherein the fixture comprises: a plurality of alloy pressure pads shaped to contact a component to be brazed or diffusion bonded; a plurality of springs, wherein each spring of the plurality of springs is shaped to have a substantially constant stress throughout the spring; and at least one alloy support, wherein the plurality of springs are between and contacting the at least one alloy support and the plurality of alloy pressure pads to exert spring forces on the plurality of alloy pressure pads. The method also may include heating the component to between about 2000° F. and about 2300° F. to braze or diffusion bond a first part of the component to a second part of the component; and cooling the component.

The details of one or more examples are set forth in the accompanying drawings and the description below. Other features, objects, and advantages will be apparent from the description and drawings, and from the claims.

DETAILED DESCRIPTION

In general, the disclosure describes a fixture for brazing or the diffusion bonding of multiple parts of a component and techniques for using the fixture. In some examples, the fixture may include springs, alloy pressure pads, and alloy supports. The springs may be shaped such that the spring possesses constant stress throughout the spring, which may provide high strain for a given load. In a brazing technique, as the fixture and the multiple parts of the component are heated to the brazing temperature, the filler metal melts, and the strain in the spring releases and presses the parts of the component together. In diffusion bonding, the springs may be used to press the parts of the component together while heating the component.

In some examples, the fixture may include a plurality of springs, and at least one of the spring stiffness, pre-load, or load vectors may be simultaneously solved to achieve substantial force and moment equilibrium (e.g., balance) about the parts to be brazed or diffusion bonded. This may reduce or substantially eliminate the need for residual loads to be reacted through the outer alloy supports to the parts to be brazed or diffusion bonded. The fixture also may be assembled efficiently. Additionally or alternatively, this may reduce or substantially eliminate distortion of the component during the brazing or diffusion bonding technique, improve tooling life (thus reducing cost), or both.

In some examples, the relative lengths of the springs and the alloy pressure pads may be selected such that the force applied to the multiple parts of the component to be brazed or diffusion bonded is neutral with increasing temperature, increases with increasing temperature, or increases with rising temperature.

Figure 1:
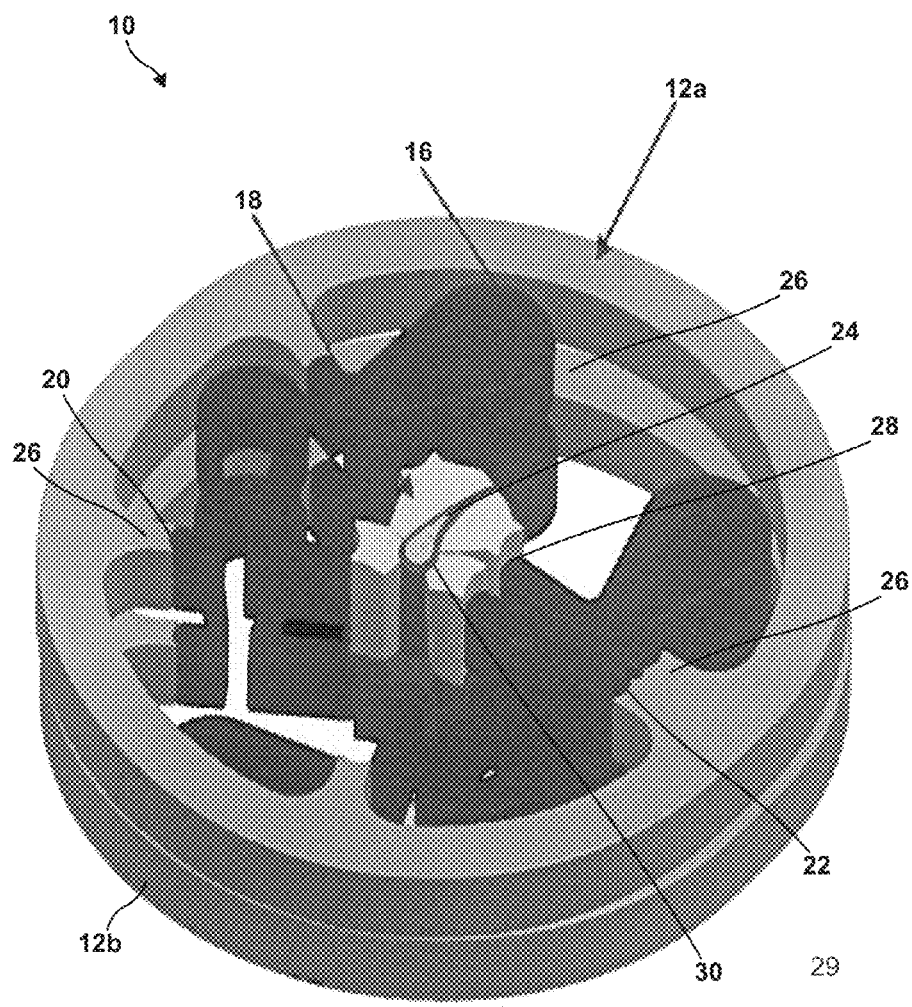
FIG. 1 is a conceptual and schematic diagram illustrating an example fixture for brazing or diffusion bonding multiple parts of a component.

FIG. 1 is a conceptual and schematic diagram illustrating an example fixture 10 for high temperature brazing or diffusion bonding. As shown in FIG. 1, fixture 10 includes a first alloy support 12a, a second alloy support 12b (collectively, "alloy supports 12"), a plurality of springs 16a-16d (collectively, "springs 16"), and a plurality of alloy pressure pads 18a-18d (collectively, "alloy pressure pads 18"). Although particular numbers of alloy supports 12, springs 16, and pressure pads 18 are illustrated in the example of FIG. 1, in other examples, fixture 10 may include different numbers of at least one of alloy supports 12, springs 16, or alloy pressure pads 18. For example, the components to be brazed or diffusion bonded may affect at least one of the number of alloy supports 12, springs 16, or alloy pressure pads 18.

Component 24 includes a plurality of parts (e.g., at least two), which are joined in the brazing or diffusion bonding technique. For example, as shown in FIG. 1, component 24 may include a gas turbine engine blade, which includes a coversheet and a support structure. The support structure may include a plurality of spars, to which the coversheet is brazed or diffusion bonded to join the coversheet and support structure. In some examples, the coversheet and support structures may each comprise a metal or an alloy, such as a Ni-based superalloy. During the brazing technique, component 24 is heated above the melting point (e.g., slightly above the melting point) of the filler metal, which melts and results in the coversheet being pressed against the spars of the support structure by fixture 10. When the filler metal cools, the coversheet is joined to the spars. In other examples, fixture 10 may be used to braze or diffusion bond more than two parts, and may be used to form other components 24 using a brazing or diffusion bonding technique.

Fixture 10 includes alloy supports 12, which may be shaped to provide support to respective ends of springs 16 (e.g., the end of springs 16 distal from the component 24 to be brazed or diffusion bonded). In the example of FIG. 1, alloy supports 12 are generally annular in shape, and include one or more protrusions 26, each of protrusions 26 including a respective surface 20 that is shaped to engage with a respective end of springs 16. In other examples, alloy supports 12 may define another shape, such as a hollow polygonal shape including any number of sides. Additionally or alternatively, although alloy supports 12 are generally planar, in other examples, alloy supports 12 may not be generally planar.

Each of alloy supports 12 includes five protrusions 26. In other examples, alloy supports 12 may include more or fewer protrusions 26. Alternatively, alloy supports 12 may not include protrusions 26, and instead may include depressions or other structural features shaped to engage with a respective one of curved ends 22.

In the example of FIG. 1, each of one or more surfaces 20 are curved in at least one dimension to engage a respective curved end 22 of springs 16. The curvature of each of one or more surfaces 20 and complimentary curvature of respective curved ends 22 of springs 16 may reduce or substantially eliminate relative movement between one or more surfaces 20 and respective curved ends 22 while component 24 during the brazing or diffusion bonding technique. Similarly, in other examples, curved ends 22 may define a different shape, such as a flat, pointed, or other shape.

Alloy supports 12 may be formed of an alloy that possesses material properties including a sufficiently high melting temperature, sufficiently high stiffness, and the like to provide a relatively stable platform during the brazing or diffusion bonding technique. For example, alloy supports 12 may comprise TZ molybdenum (TZM), an alloy that includes about 0.50% titanium, about 0.08% zirconium, about 0.02% carbon, and a balance molybdenum. TZM may possess sufficiently high strength at high temperatures, such as temperatures between about 2000° F. and about 2300° F. (between about 1093° C. and about 1260° C.).

Fixture 10 also includes springs 16. In the example of FIG. 1, fixture 10 is illustrated with eight springs 16, four springs 16 that engage with first alloy support 12a and four springs 16 that engage with second alloy support 12b. Additionally, fixture 10 may include two more springs 16, not shown in FIG. 1. In other examples, fixture 10 may include more or fewer springs 16.

Each of springs 16 may be shaped and manufactured to have constant stress throughout the respective spring 16. Constant stress throughout the spring 16 may provide high strain for a given load, and may reduce stress concentration in the spring 16. In the example of FIG. 1, each of springs 16 has a shape similar to a horseshoe or a capital omega symbol.

Springs 16 may comprise any material that possesses characteristics that are advantageous for use in a spring in high temperature brazing or diffusion bonding. For example, the material may possess sufficient creep strength at temperatures up to about 2300° F. (about 1260° C.) for use in a brazing or diffusion bonding technique. The material also may be relatively stable at temperature up to about 2300° F. (about 1260° C.) in a low pressure atmosphere, such as vacuum or near-vacuum (e.g., the material may not sublimate at the temperatures and pressures used during the brazing or diffusion bonding technique). The material also may possess sufficient fracture toughness, thermal shock resistance, and room temperature strength to allow assembly of fixture 10 at room temperature, heating to temperatures between about 2000° F. and about 2300° F. (between about 1093° C. and about 1260° C.) during the brazing or diffusion bonding technique, and cooling back to room temperature. An example material from which springs 16 may be formed includes silicon nitride.

Fixture 10 also may include alloy pressure pads 18. Alloy pressure pads 18 may each contact one or more of springs 16, and may be disposed between springs and component 24. Alloy pressure pads 18 may be shaped with inner surfaces 30 that substantially complement the shape of respective portions of component 24, such that inner surfaces 30 intimately contact surfaces of component 24. Respective curved ends 28 of springs 16 may contact alloy pressure pads 18 to exert a respective forces to press inner surfaces 30 against surfaces of component 24, and thus may provide the force pressing the plurality of parts of component 24 together during the brazing or diffusion bonding technique. Because inner surfaces 30 of alloy pressure pads 18 are shaped to substantially complement the shape of surfaces of component 24, alloy pressure pads 18 may distribute the forces generated by springs 16 across the surfaces of component 24, which may result in a more uniform pressure on the surfaces of component 24.

In some examples, the alloy pressure pads 18 may have each have a coefficient of thermal expansion that is substantially the same (e.g., the same or nearly the same) as the coefficient of thermal expansion of component 24. Because component 24 and alloy pressure pads 18 may undergo significant temperature changes during the brazing or diffusion bonding technique (e.g., from about room temperature to between about 2000° F. and about 2300° F.), mismatch between the coefficients of thermal expansion may result in differential dimensional changes, resulting in deviations between the geometry of inner surfaces 30 and the surfaces of component 24. By minimizing the difference between the coefficients of thermal expansion of alloy pressure pads 18 and the coefficient of thermal expansion of component 24, the relative changes in geometry between alloy pressure pads 18 and component 24 may be reduced or substantially eliminated.

In some examples, alloy pressure pads 18 may comprise an alloy with a composition similar to that of one or more parts of component 24. Forming alloy pressure pads 18 as the same or a similar alloy as one or more parts of component 24 may result in the coefficients of thermal expansion being substantially the same. For example, when one or more parts of component 24 are formed of a Ni-based superalloy, alloy pressure pads 18 may be formed of a Ni-based superalloy.

Figure 2:
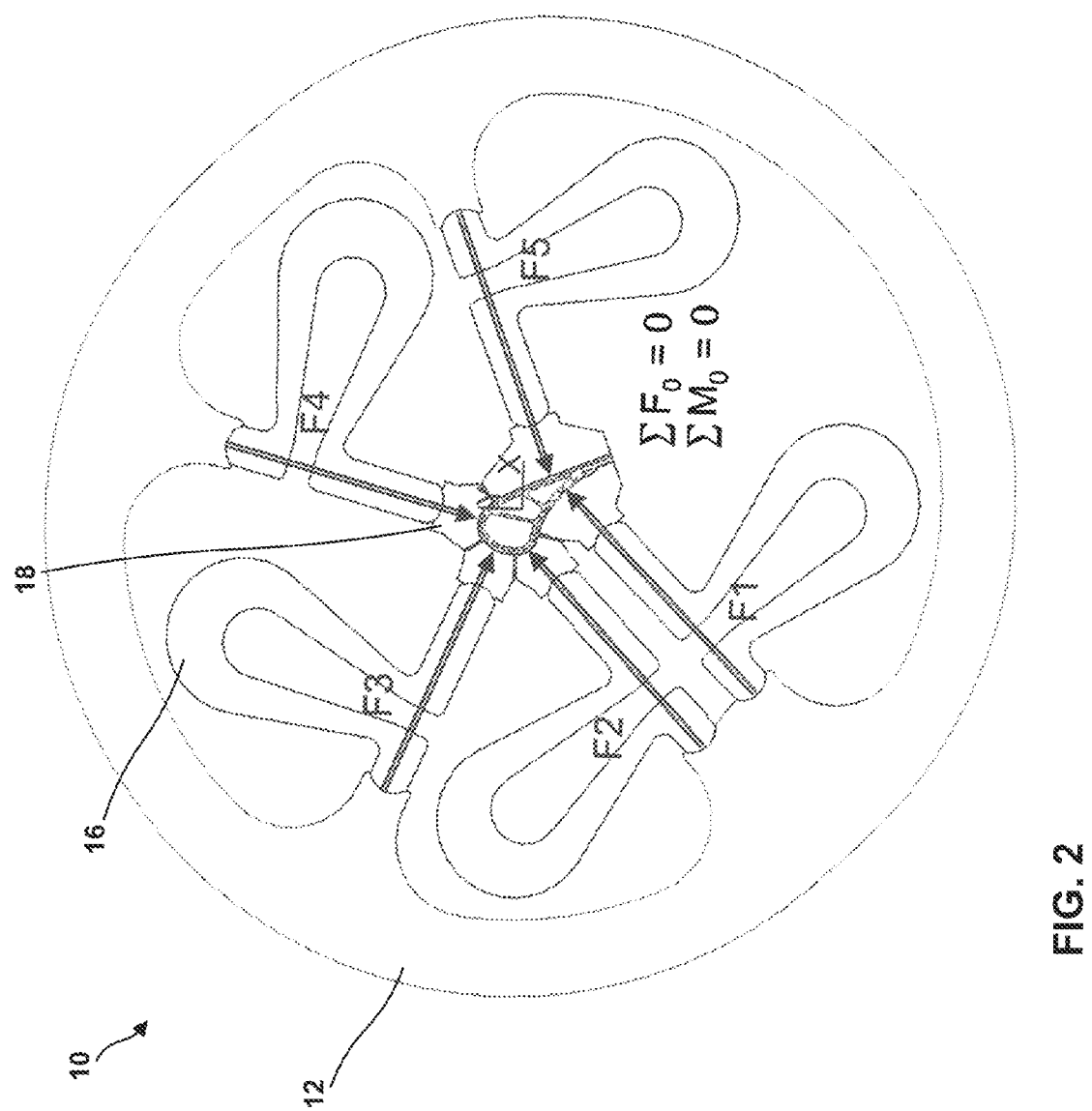
FIG. 2 is a conceptual and schematic diagram illustrating an example fixture for brazing or diffusion bonding multiple parts of a component.

In some examples, alloy supports 12, springs 16, and alloy pressure pads 18 may be configured such that the sum of forces and the sum of moments on component 24 are substantially equal to zero (e.g., zero or nearly zero). FIG. 2 is a conceptual and schematic diagram illustrating an example fixture for brazing or diffusion bonding multiple components together, in which the sum of forces and the sum of moments on component 24 are substantially equal to zero. In other words, the forces and moments exerted by springs 16 on component 24 may be substantially in equilibrium and the design may be load balanced. This may be accomplished by simultaneously solving the spring stiffness, pre-load, and load vectors for each of springs 16. Load balancing may be achieved at least partially through selection of spring rates of springs 16 and preloads on springs 16. By being load balanced, fixture 10 may be more dimensionally stable under changes in temperature compared to a fixture that is not load balanced.

In some examples, fixture 10 also may include a compliant layer 29 between inner surfaces 30 of alloy pressure pads 18 and the surface of component 24. Compliant layer 29 may further assist in distributing the load across the surface of component 24. Compliant layer 29 also may be formed from a material and include a geometry that allows compliant layer 29 to deform (e.g., crush) a few thousandths of an inch (e.g., 0.003 to 0.004 inch) at the brazing or diffusion bonding pressure. This may facilitate achieving the desired brazing or diffusion bonding pressure while reducing a chance of damaging (e.g., deforming) component 24. In some examples, compliant layer 29 also functions as a diffusion barrier layer between component 24 and alloy pressure pads 18, which reduces a chance for alloy pressure pads 18 to bond to component 24 during the brazing or diffusion bonding technique. In some examples, such as when component 24 comprises a Ni-based superalloy, compliant layer 29 may include a mild steel screen.

Figure 3:
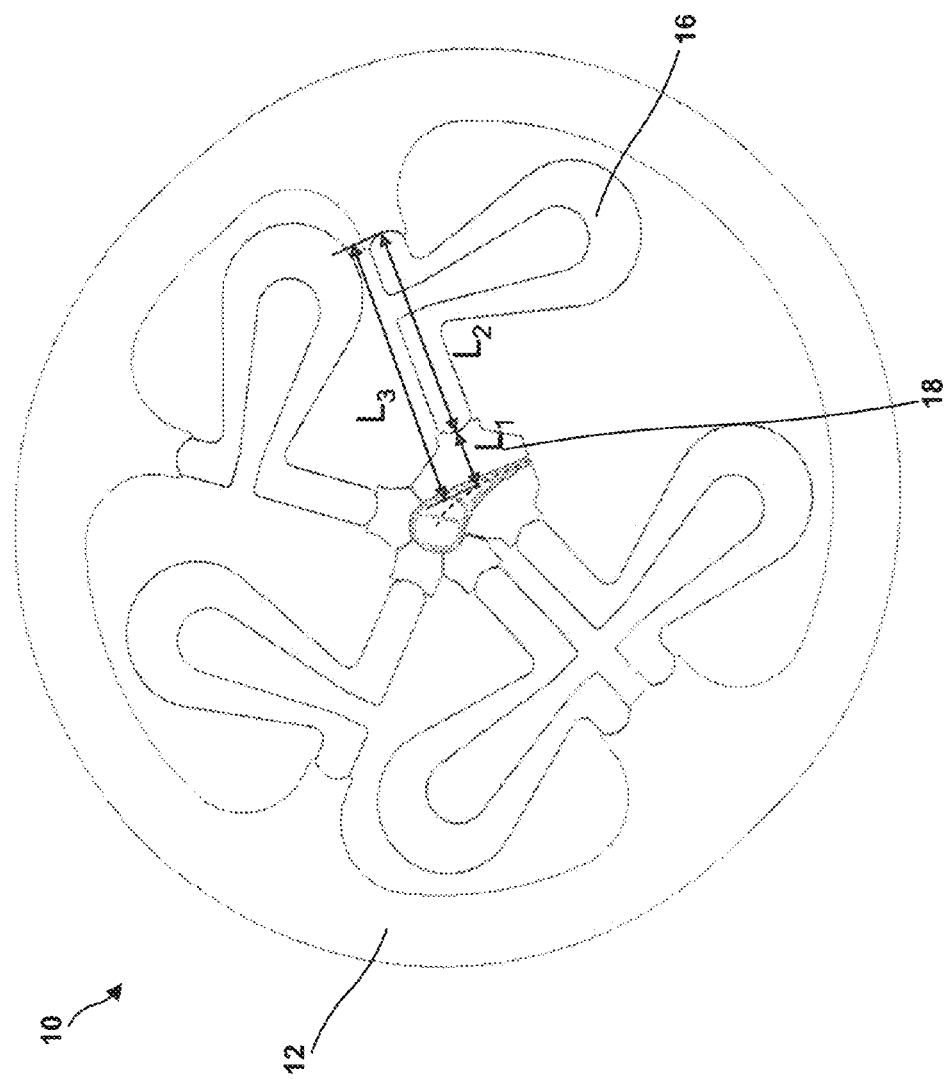
FIG. 3 is a conceptual and schematic diagram illustrating an example fixture for brazing or diffusion bonding multiple parts of a component.

In some examples, the relative lengths of the springs 16 and alloy pressure pads 18 may be selected to control whether the load on component 24 increases, decreases, or remains substantially constant as the temperature increases. FIG. 3 is a conceptual and schematic diagram illustrating an example fixture for brazing or diffusion bonding multiple parts of a component together, which illustrates the relative lengths of a spring 16 and an alloy pressure pad 18. As shown in FIG. 3, the length of an alloy pressure pad 18 may be represented as $L_1$ and is measured from a surface of component 24 to the contact point between alloy pressure pad 18 and spring 16. The length of spring 16 is represented as $L_2$ and is measured between the contact point between alloy pressure pad 18 and spring 16 and the contact point between spring 16 and alloy supports 12. The total length between the surface of component 24 and the contact point between spring 16 and alloy supports 12 is represented as $L_3$ and is the sum of $L_1$ and $L_2$. The total change of the length under a change in temperature is represented by the equation $L_1\alpha_1\Delta T + L_2\alpha_2\Delta T = L_3\alpha_3\Delta T$, where $\alpha_1$ is the coefficient of thermal expansion of alloy pressure pad 18, $\alpha_2$ is the coefficient of thermal expansion of spring 16, and $\alpha_3$ is the coefficient of thermal expansion of alloy supports 12, and $\Delta T$ is the change in temperature. An example value of at for a Ni-based superalloy is $9.7\times10^{-6\circ}$ $F.^{-1}$, an example value for $\alpha_2$ for silicon nitride is $1.7\times10^{-6\circ}$ $F.^{-1}$, and an example value of $\alpha_3$ for TZM is $3.4\times10^{-6\circ}$ $F.^{-1}$.

By increasing the relative length of spring 16 and decreasing the relative length of alloy pressure pad 18, the increase in load under increasing temperature may be reduced or eliminated. For example, if a given structural configuration is neutral (load is constant under change in temperature), by increasing the relative length of spring 16 and decreasing the relative length of alloy pressure pad 18, the load will decrease as the temperature increases. Conversely, by decreasing the relative length of spring 16 and increasing the relative length of alloy pressure pad 18, relative increase in load under increasing temperature may be increased. For example, if a given structural configuration is neutral (load is constant under change in temperature), by decreasing the relative length of spring 16 and increasing the relative length of alloy pressure pad 18, the load will increase as the temperature increases. By careful selection of the relative lengths of spring 16 and alloy pressure pad 18, the load on component 24 through alloy pressure pad 18 may be caused to remain substantially constant, to increase, or to decrease as the temperature increases.

This selection of relative lengths of spring 16 and alloy pressure pad 18 may be done for each spring 16 and alloy pressure pad 18 in fixture 10. In some examples, the selection of relative lengths of spring 16 and alloy pressure pad 18 may be done to maintain force and moment equilibrium, as described with reference to FIG. 2. The selection of relative length of spring 16 and alloy pressure pad 18 also may be made to address potential problems during the brazing or diffusion bonding technique. For example, if the springs break under low temperature assembly of fixture 10, the overall load may be lowered and the relative lengths of spring 16 and alloy pressure pad 18 may be selected such that the load on component 24 increases as temperature increases. This may result in the load being lower during assembly and substantially the same at the brazing or diffusion bonding temperature, thus reducing a likelihood of the springs 16 cracking during assembly while producing sufficient loads at the brazing or diffusion bonding temperature.

Because springs 16 are between alloy supports 12 and alloy pressure pads 18, there is no contact between similar alloys in fixture 10. This may reduce or substantially eliminate a need for anti-galling or diffusion barrier coatings between parts of fixture 10. Additionally, as described above, in some examples, at least one of the spring stiffness, pre-load, or load vectors may be simultaneously solved to achieve force and moment equilibrium about the parts to be brazed or diffusion bonded. This may reduce or substantially eliminate the need for residual loads to be reacted through the alloy supports 12 to component 24. Additionally or alternatively, this may reduce or substantially eliminate distortion of component 24 during the brazing or diffusion bonding technique, improve life of fixture 10, or both.

Figure 4:
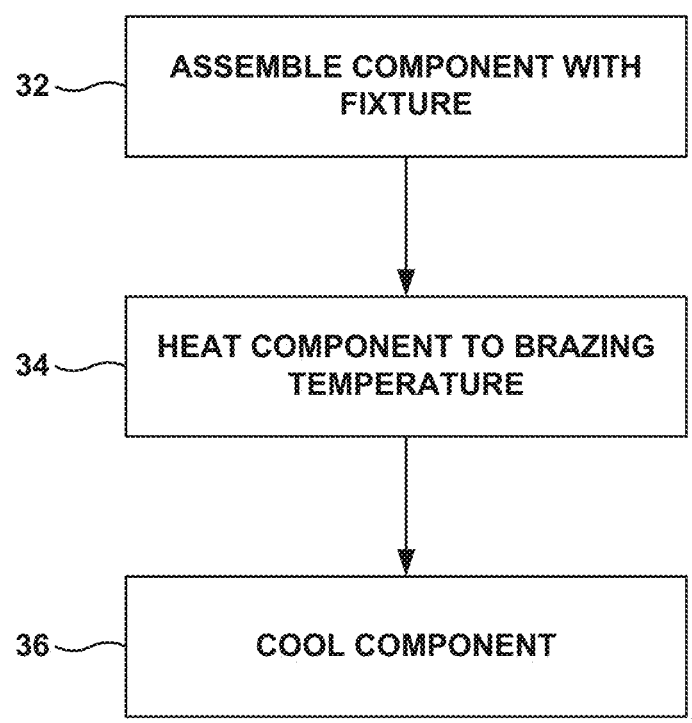
FIG. 4 is a flow diagram illustrating an example technique for brazing or diffusion bonding multiple parts of a component.

FIG. 4 is a flow diagram illustrating an example technique for brazing a component 24 using fixture 10. The technique of FIG. 4 will be described with respect to fixture 10 of FIG.

1, although other fixtures may be used in the technique of FIG. 4, and fixture 10 may be used in other brazing or diffusion bonding techniques.

The technique of FIG. 4 includes assembling component 24 and fixture 10 (32). In some examples, assembling component 24 and fixture 10 (32) may include, for each pair of alloy pressure pad 18 and spring 16, assembling a respective alloy pressure pad 18 and a respective spring 16, with or without compliant layer 29 between the alloy pressure pad 18 and component 24. In some examples, assembling component 24 and fixture 10 (32) may utilize a cold build fixture to constrain the component 24 within fixture 10 while springs 16 and alloy pressure pads 18 are being assembled within alloy support 12.

The technique of FIG. 4 also includes heating component 24 and assembly 10 to the brazing temperature (34). The brazing temperature may be near (e.g., slightly below) the melting point of one or more part of component 24. For example, when component 24 includes an airfoil, the brazing temperature may be slightly below the melting temperature of the coversheet. In some examples, the coversheet may be a Ni-based superalloy. As described above, in some examples, brazing may be performed at a relatively high temperature, such as between about 2000° F. and about 2300° F. (between about 1093° C. and about 1260° C.). In some examples, the brazing may be performed at a temperature of about 2150° F. (about 1177° C.). In some implementations, the brazing of component 24 may be performed at vacuum or near-vacuum pressures.

As component 24 is heated near the melting temperature of one or more parts of component 24, the filler metal will melt (e.g., liquefy). The strain in springs 16 releases as the filler metal melts and springs 16 press the parts of component 24 together. Component 24 and assembly 10 are then cooled (36), at which time the melted filler metal cools and solidifies, joining the part(s) of component 24 against which they were pressed by springs 16. In this way, fixture 10 may be used in a brazing technique to join a plurality of parts of a component.

Figure 5:
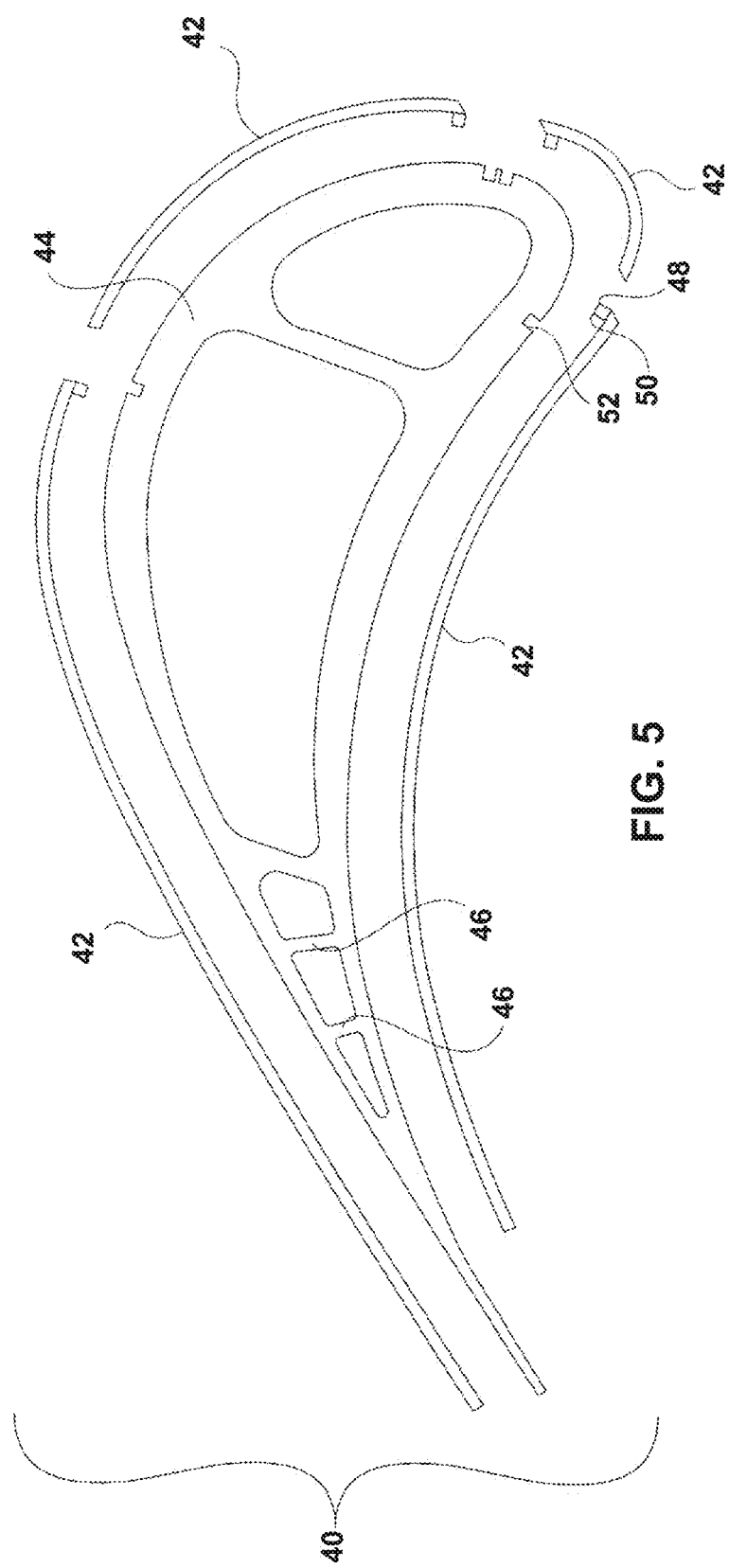
FIG. 5 is an exploded sectional view of an example component including a coversheet and a spar, which may be brazed or diffusion bonded together using techniques in accordance with this disclosure.

FIG. 5 is an exploded sectional view of an example component 40 including a coversheet 42 and a spar 44, which may be brazed together using techniques in accordance with this disclosure. In the example of FIG. 5, component 40 is an airfoil for a gas turbine engine. Each of coversheet 42 and spar 44 are preformed, and may be cast or wrought. In the example of FIG. 5, coversheet 42 includes a plurality of members (e.g., four members). In other examples, coversheet 42 may include more or fewer members.

Coversheet 42 is shaped to substantially correspond to an outer surface of spar 44. In some examples, coversheet 42 and spar 44 may be formed of similar materials, such as similar alloys. In other examples, coversheet 42 and spar 44 may be formed of different materials, selected to provide different properties. For example, spar 44 may be formed of a material selected to provide strength to component 40, while coversheet 42 is formed of a material selected to provide resistance to oxidation or a relatively low coefficient of thermal expansion.

Spar 44 may have a surface that defines the curvature of component 40 after coversheet 42 is joined thereto. Spar 44 also may be sufficiently strong to withstand the operating loads for the component 40. For example, spar 44 may include structural members 46 that provide strength to spar 44.

In some examples, coversheet 42 and spar 44 include one or more locating features 48 including protrusion 50 of coversheet 42 and complementary depression 52 of spar 44. The locating features 48 may assist with positioning coversheet 42 relative to spar 44 during the brazing technique. The members of coversheet 42 may be pressed by fixture 10 against the surface of spar 44 during the brazing process to join the members of coversheet 42 to spar 44 using a filler metal.

Various examples have been described. These and other examples are within the scope of the following claims.

The invention claimed is:

1. A fixture comprising:
a plurality of alloy pressure pads shaped to contact a component to be brazed or diffusion bonded;
a plurality of springs, wherein each spring of the plurality of springs is shaped with a horseshoe or a capital omega symbol shape; and
at least one generally annular alloy support, wherein the plurality of springs are between and contacting the at least one generally annular alloy support and the plurality of alloy pressure pads to exert spring forces on the plurality of alloy pressure pads.

2. The fixture of claim 1, wherein the plurality of springs comprises a plurality of silicon nitride springs.

3. The fixture of claim 1, wherein the plurality of alloy pressure pads comprise a Ni-based superalloy.

4. The fixture of claim 1, wherein the at least one generally annular alloy support comprises an alloy comprising molybdenum, titanium, and zirconium.

5. The fixture of claim 1, further comprising at least one compliant member configured to be positioned between the plurality of alloy pressure pads and the component to be brazed or diffusion bonded.

6. The fixture of claim 5, wherein the at least one compliant member comprises a mild steel screen.

7. The fixture of claim 1, wherein each spring of the plurality of springs has a respective spring constant, a respective pre-load, and a respective load vector; and wherein the respective spring constant of each of the plurality of springs, the respective pre-load of each of the plurality of springs, and the respective load vector for each of the plurality of springs are simultaneously solved to produce force equilibrium and moment equilibrium at the component.

8. The fixture of claim 1, wherein a spring of the plurality of springs and an alloy pressure pad of the plurality of alloy pressure pads are provided in a pair, and wherein a length of the spring and a length of the alloy pressure pad are selected such that the load on the component remains substantially constant as the temperature of the fixture increases.

9. The fixture of claim 1, wherein a spring of the plurality of springs and an alloy pressure pad of the plurality of alloy pressure pads are provided in a pair, and wherein a length of the spring and a length of the alloy pressure pad are selected such that the load on the component increases as the temperature of the fixture increases.

10. The fixture of claim 1, wherein a spring of the plurality of springs and an alloy pressure pad of the plurality of alloy pressure pads are provided in a pair, and wherein a length of the spring and a length of the alloy pressure pad are selected such that the load on the component decreases as the temperature of the fixture increases.

11. A method comprising:
assembling a component in a fixture, wherein the fixture comprises:
a plurality of alloy pressure pads shaped to contact a component to be brazed or diffusion bonded;

a plurality of springs, wherein each spring of the plurality of springs is shaped with a horseshoe or a capital omega symbol shape; and at least one generally annular alloy support, wherein the plurality of springs are between and contacting the at least one generally annular alloy support and the plurality of alloy pressure pads to exert spring forces on the plurality of alloy pressure pads;

heating the component to between about 2000° F. and about 2300° F. to braze or diffusion bond a first part of the component to a second part of the component; and cooling the component.

12. The method of claim 11, wherein the plurality of springs comprises a plurality of silicon nitride springs.

13. The method of claim 11, wherein assembling the component in the fixture comprises temporarily constraining the component in a cold build fixture and assembling the plurality of springs sequentially.

14. The method of claim 11, wherein heating the component comprises heating the component in a vacuum.

15. The method of claim 11, further comprising simultaneously solving a respective spring constant of each of the plurality of springs, a respective pre-load of each of the plurality of springs, and a respective load vector for each of the plurality of springs to produce force equilibrium and moment equilibrium at the component.

16. The method of claim 11, wherein a spring of the plurality of springs and an alloy pressure pad of the plurality of alloy pressure pads are provided in a pair, the method further comprising selecting a length of the spring and a length of the alloy pressure pad such that the load on the component remains substantially constant as the temperature of the fixture increases.

17. The method of claim 11, wherein a spring of the plurality of springs and an alloy pressure pad of the plurality of alloy pressure pads are provided in a pair, the method further comprising selecting a length of the spring and a length of the alloy pressure pad such that the load on the component increases as the temperature of the fixture increases.

18. The method of claim 11, wherein a spring of the plurality of springs and an alloy pressure pad of the plurality of alloy pressure pads are provided in a pair, the method further comprising selecting a length of the spring and a length of the alloy pressure pad such that the load on the component decreases as the temperature of the fixture increases.

* * * * *